(12) United States Patent
Ledroz et al.

(10) Patent No.: US 12,473,817 B2
(45) Date of Patent: Nov. 18, 2025

(54) DOWNHOLE GYROSCOPIC SURVEYING MEASUREMENTS UNDER DYNAMIC CONDITIONS

(71) Applicant: Schlumberger Technology Corporation, Sugar Land, TX (US)

(72) Inventors: Adrian Guillermo Ledroz, Houston, TX (US); Onyemelem Jegbefume, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 36 days.

(21) Appl. No.: 18/602,333

(22) Filed: Mar. 12, 2024

(65) Prior Publication Data

US 2025/0290402 A1    Sep. 18, 2025

(51) Int. Cl.
 *E21B 47/00* (2012.01)
 *G01C 19/00* (2013.01)
 *G01P 15/14* (2013.01)

(52) U.S. Cl.
 CPC .............. *E21B 47/00* (2013.01); *G01C 19/00* (2013.01); *G01P 15/14* (2013.01)

(58) Field of Classification Search
 None
 See application file for complete search history.

(56) References Cited

U.S. PATENT DOCUMENTS

| | | | | |
|---|---|---|---|---|
| 4,747,317 A | * | 5/1988 | Lara | E21B 47/022 73/866.5 |
| 4,799,391 A | * | 1/1989 | Lara | E21B 47/022 33/302 |
| 4,909,336 A | * | 3/1990 | Brown | E21B 47/022 175/45 |
| 4,987,684 A | * | 1/1991 | Andreas | E21B 47/022 33/304 |
| 9,631,475 B2 | * | 4/2017 | Ledroz | G01C 19/00 |
| 2008/0134784 A1 | * | 6/2008 | Jeng | G06F 3/0485 73/514.01 |
| 2011/0015862 A1 | * | 1/2011 | Sato | G01C 21/188 702/6 |
| 2016/0145997 A1 | * | 5/2016 | Van Steenwyk | E21B 47/022 33/304 |
| 2018/0128643 A1 | * | 5/2018 | Ledroz | G01C 25/00 |
| 2019/0330979 A1 | * | 10/2019 | Weston | E21B 47/12 |
| 2024/0392680 A1 | * | 11/2024 | Katayama | E21B 47/024 |

FOREIGN PATENT DOCUMENTS

EP    2927419 A1    10/2015

* cited by examiner

*Primary Examiner* — Quan Zhen Wang
*Assistant Examiner* — Jerold B Murphy

(57) ABSTRACT

A method for making downhole gyroscopic surveying measurements includes making at least one cross-axial gyroscope measurement in the subterranean wellbore; making accelerometer measurements including cross-axial accelerometer measurements in the subterranean wellbore; evaluating the cross-axial accelerometer measurements to determine at least one tool motion induced cross-axial rotational component; and removing the tool motion induced cross-axial rotational component from the at least one cross-axial gyroscope measurement to determine a compensated cross-axial gyroscope measurement.

16 Claims, 4 Drawing Sheets

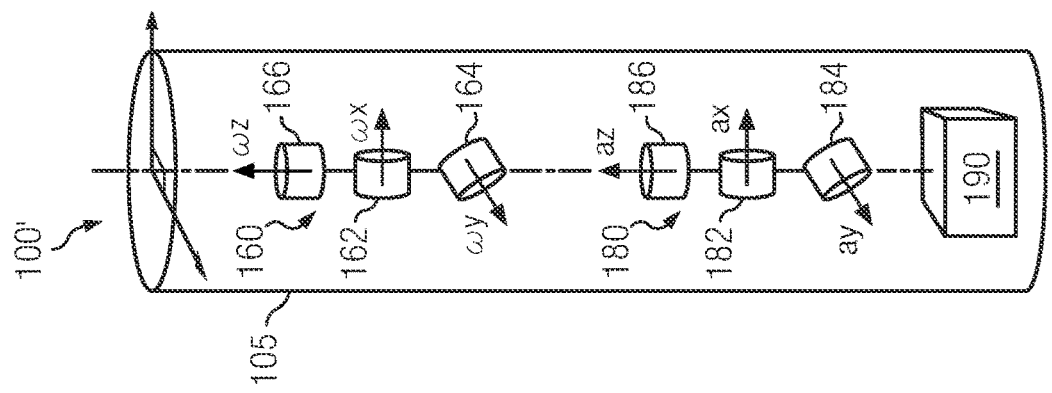
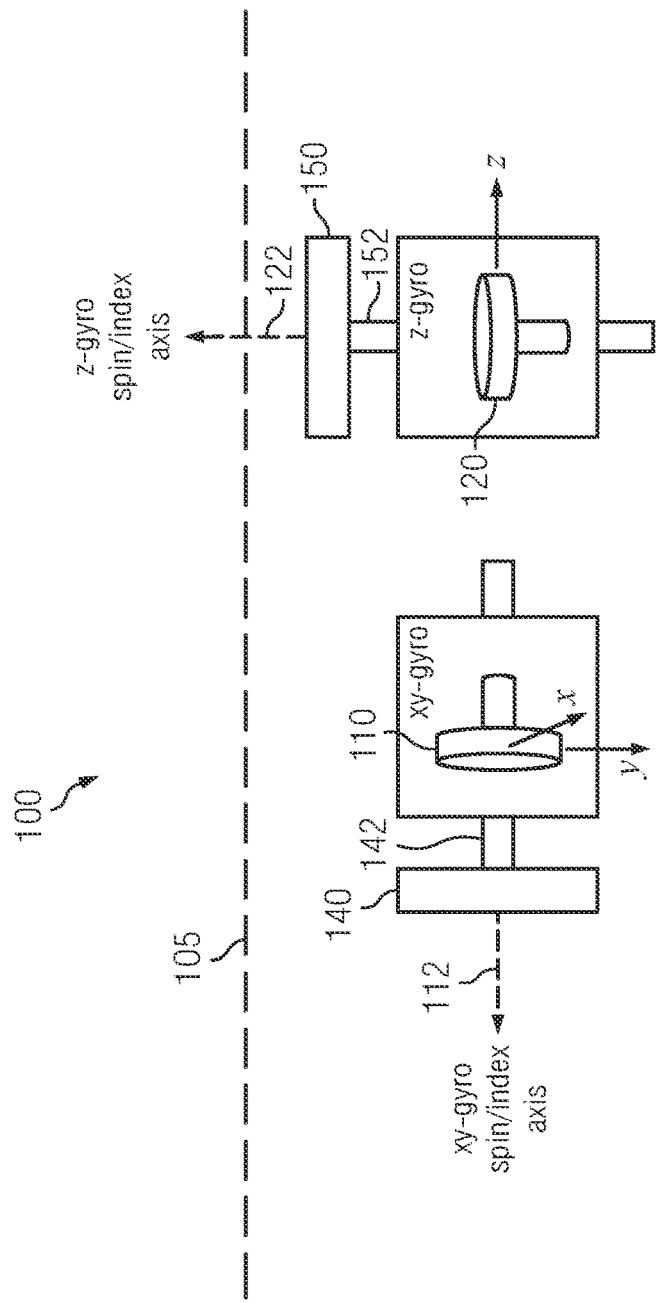
FIG. 3
FIG. 2

DOWNHOLE GYROSCOPIC SURVEYING MEASUREMENTS UNDER DYNAMIC CONDITIONS

FIELD

Disclosed embodiments relate generally to downhole gyroscopic surveying measurements and particularly to a method for making gyroscopic surveying measurements under dynamic conditions.

BACKGROUND

Gyroscopes are commonly utilized in wellbore surveying operations. Gyroscopic surveying measurements may be used to measure wellbore azimuth with respect to true north (e.g., in a global north-east-down NED coordinate system). Such measurements are sometimes referred to as gyrocompass measurements. Gyroscopic measurements may be advantageous in certain surveying operations as they are generally not susceptible to magnetic interference.

Gyroscopes used in wellbore surveying operations are configured to sense the rotation of the Earth about its axis and to determine a magnitude (or magnitudes) of one or more components of Earth's rotation (e.g., the horizontal component). When conducting a gyroscopic survey of a wellbore, it is desirable that the survey tool remains perfectly stationary with respect to the Earth while the gyroscopic measurements are made. Being stationary ensures that the gyroscopic sensor(s) is/are subject only to the rotational motion of the Earth while the measurements are being made. However, downhole tools are seldom perfectly stationary in the wellbore.

In offshore operations, such as those that employ a fixed platform or a floating or semisubmersible drilling platform (rig), the motion of the sea (e.g., the wave action) can move the gyroscopic surveying tool in the wellbore. Such motion can be particularly problematic at low depths (near the top of the hole) where the motion is greatest and magnetic interference complicates the use of magnetic surveying measurements. Moreover, at low inclinations, such motion tends to occur principally about the cross-axial rotational axes (e.g., the x- and y-axes). There is a need in the industry for improved gyroscopic surveying techniques, particularly, for compensating gyroscopic measurements for rotation about an axis orthogonal to the tool and/or wellbore axis.

SUMMARY

A method for making downhole gyroscopic surveying measurements includes making at least one cross-axial gyroscope measurement in the subterranean wellbore; making accelerometer measurements including cross-axial accelerometer measurements in the subterranean wellbore; evaluating the cross-axial accelerometer measurements to determine at least one tool motion induced cross-axial rotational component; and removing the tool motion induced cross-axial rotational component from the at least one cross-axial gyroscope measurement to determine a compensated cross-axial gyroscope measurement.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 2 depicts an example gyroscopic surveying tool.

FIG. 3 schematically depicts another gyroscopic surveying tool.

DETAILED DESCRIPTION

Embodiments of this disclosure include apparatuses and methods for making compensated cross-axial gyroscope measurements. One example method includes making at least one cross-axial gyroscope measurement in the subterranean wellbore; making accelerometer measurements including cross-axial accelerometer measurements in the subterranean wellbore; evaluating the cross-axial accelerometer measurements to determine at least one tool motion induced cross-axial rotational component; and removing the tool motion induced cross-axial rotational component from the at least one cross-axial gyroscope measurement to determine the compensated cross-axial gyroscope measurement.

Example embodiments disclosed herein may provide various technical advantages and improvements over the prior art. For example, the disclosed embodiments may enable gyroscopic measurements made in a borehole to be compensated (corrected) for the effects of measurement tool motion. Such compensation may advantageously enable sea induced motion to be compensated in offshore drilling operations and may further enable gyroscopic toolface measurements to be made with improved accuracy in near vertical wells. Moreover, such compensation may enable triaxial gyroscopic compensation in high inclination (near horizontal wells), which may in turn enable gyroscopic azimuth and gyroscopic toolface measurements to be made with improved accuracy and timeliness.

Figure 1:
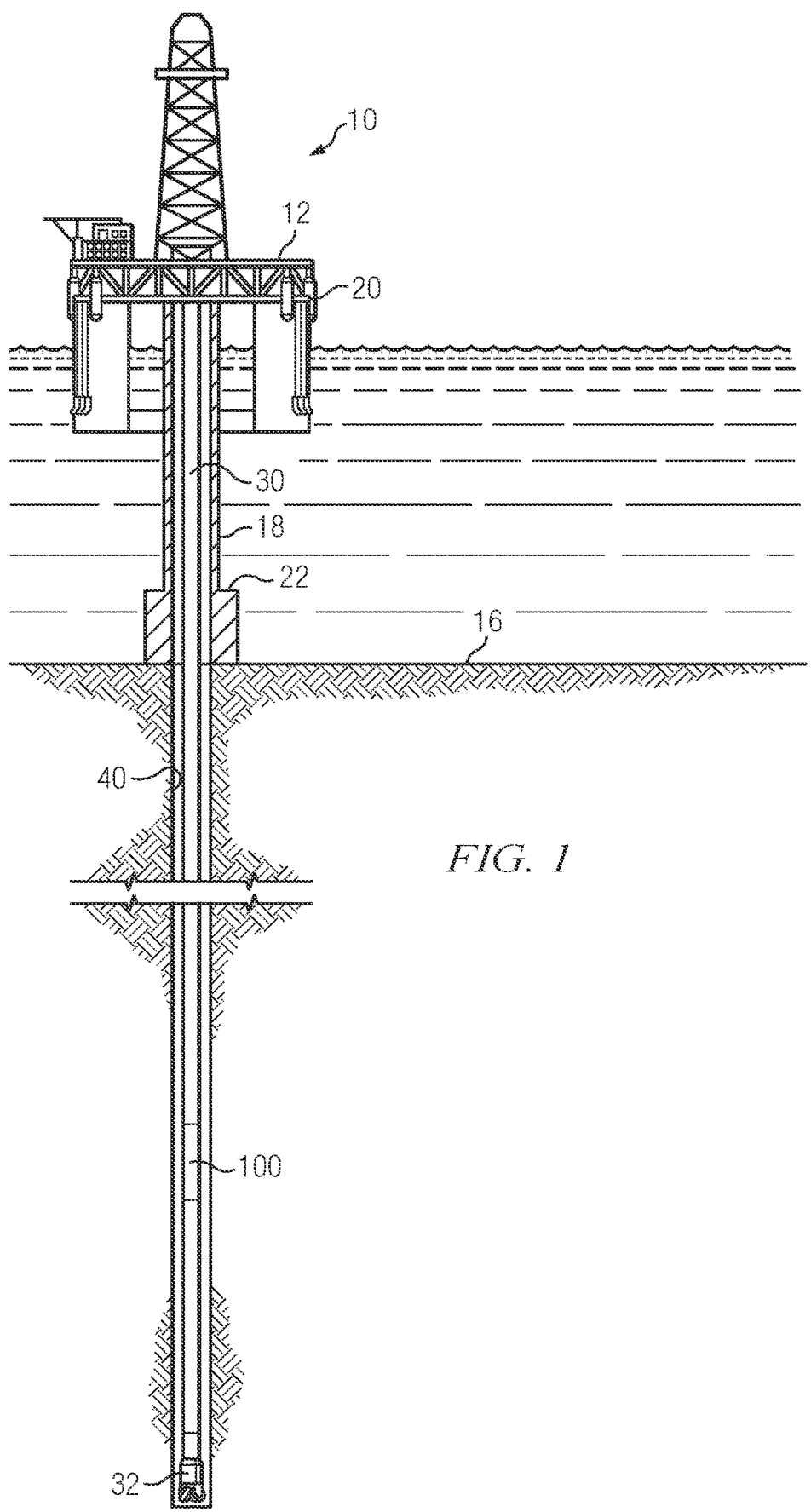
FIG. 1 depicts an offshore drilling rig including one example gyroscopic surveying tool.

FIG. 1 depicts a drilling rig 10 including a disclosed gyroscopic surveying tool 100. A semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering a drill string 30, which, as shown, extends into wellbore 40 and includes a drill bit 32 and one embodiment of a disclosed gyroscopic surveying tool 100. The drill string 30 may further include substantially any suitable downhole tools, for example, including a drilling motor, a downhole telemetry system, a rotary steerable tool, and one or more other measurement while drilling (MWD) or logging while drilling LWD tools including various sensors for sensing downhole characteristics of the wellbore and the surrounding formation. The disclosed embodiments are not limited in these regards.

As described in more detail below, example embodiments of the gyroscopic surveying tool 100 may include substantially any suitable gyroscopic sensor, for example, including a microelectromechanical systems (MEMS) gyroscope, solid state gyroscope, a mechanical gyroscope, and/or an optical gyroscope. As known to those of ordinary skill in the art, MEMS gyroscopes are fabricated using integrated circuit fabrication technology and are used in a wide range of applications including spacecraft, aircraft, underwater devices, motor vehicles, gaming devices, and smart phones. Moreover, the gyroscopic surveying tool 100 may include substantially any suitable gyroscopic sensor arrangement(s), for example, a single axis gyroscope, a two-axis (biaxial) gyroscope or a three-axis (triaxial) gyroscope. The disclosed embodiments are not limited in these regards.

It will be understood by those of ordinary skill in the art that the deployment illustrated on FIG. 1 is merely an example. Moreover, it will be understood that the disclosed embodiments are not limited to MWD tools or gyroscopic while drilling (GWD) tools as depicted on FIG. 1, but may also include wireline or slickline gyroscopic surveying tools or drop tools that are configured for insertion in the drill string.

FIG. 2 depicts one example embodiment of gyroscopic surveying tool 100 including first and second gyroscopic sensors 110 and 120 deployed in a sensor housing 105. In the depicted example embodiment, the first gyroscopic sensor 110 includes an xy-gyroscope and the second gyroscopic sensor 120 includes a z-gyro. By xy-gyroscope it is meant that the first gyroscopic sensor 110 is configured to generate measurement signals indicative of at least one component of the Earth's rotation that is perpendicular to the axis of the wellbore (e.g., in the x-direction). In example configurations, the first gyroscopic sensor 110 may be further configured to generate measurement signals indicative of a component of the Earth's rotation in a y-direction that is perpendicular to both the x-direction and the axis of the wellbore. By z-gyroscope it is meant that the second gyroscopic sensor 120 is configured to generate measurement signals indicative of a component of the Earth's rotation that is parallel with the axis of the wellbore (the z-direction). It will therefore be understood that in the depicted example embodiment the measurement axes of the first gyroscopic sensor 110 are mutually orthogonal to one another and to the measurement axis of the second gyroscopic sensor 120. It will be further appreciated that the first and second gyroscopic sensors 110 and 120 together may be configured to make triaxial gyroscopic sensor measurements (e.g., x-, y-, and z-direction measurements).

As noted above, the first and second gyroscopic sensors 110 and 120 may include substantially any suitable gyroscopes. While the disclosed embodiments are not limited to any particular type or style of gyroscopic sensor (e.g., a MEMS gyroscope or a fiber optic gyroscope), it will be appreciated that the first and second gyroscopic sensors 110 and 120 may advantageously be configured to provide accurate measurements of the Earth's rotation rate (e.g., having a resolution of less than 0.05 degrees per hour or even having a resolution of less than 0.01 degrees per hour). Moreover, the first and second gyroscopic sensors 110 and 120 may be sufficiently small to be accommodated in a downhole tool (e.g., within the confines of a 50 mm diameter pressure housing in an GWD tool or a rotary steerable tool) and capable of operating at high downhole temperatures (e.g., up to and exceeding 150 degrees C.). Advantageous gyroscopic sensors may be further capable of surviving the severe vibration and shock that can occur during a drilling operation. In some example embodiments, the first and second gyroscopic sensors 110 and 120 may advantageously include MEMS sensors.

It will, of course, be further understood that the disclosed embodiments are not limited to the particular gyroscopic sensor arrangement shown on FIG. 2. As described above with respect to FIG. 1, the disclosed embodiments may include substantially any suitable sensor arrangement(s), for example, including a single axis gyroscope, a two-axis (biaxial) gyroscope, or a three-axis (triaxial) gyroscope.

With continued reference to FIG. 2, the first and second gyroscopic sensors 110 and 120 are configured to rotate about corresponding first and second indexing axes 112 and 122. Such rotation may be accomplished using substantially any suitable rotary mechanism. For example, a first electric motor 140 may be rotationally coupled with the first gyroscopic sensor 110 via shaft 142 and may be configured to rotate the first gyroscopic sensor 110 about the first indexing axis 112. Likewise, a second electric motor 150 may be rotationally coupled with the second gyroscopic sensor 120 via shaft 152 and may be configured to rotate the second gyroscopic sensor 120 about the second indexing axis 122. The disclosed embodiments are, of course, not limited in these regards.

As is well-known in the industry, gyroscopic sensors often have a large bias that can compromise measurement accuracy. A sensor bias is commonly understood to be a measured sensor output when the sensor input (e.g., Earth's rotation for a gyroscope) is zero. Thought of another way, sensor bias is the difference between the actual sensor output and the true sensor output when the sensor input is zero. For gyroscopic sensors, the sensor bias can have numerous root causes, for example, including sensor imperfections, mechanical misalignments, electrical noise, and electrical component offsets or biases (among others).

Owing to the random nature of the bias (from one gyroscopic sensor to the next) and the large uncertainty associated with predicting the bias, the gyroscopic sensor bias is commonly removed via indexing. Such indexing may include rotating the gyroscopic sensor to two or more rotational positions (e.g., using the gimbaling mechanisms described above with respect to FIG. 2) and making gyroscopic measurements at each rotational position. These measurements may then be combined (e.g., via subtracting one from the other) to remove or cancel the bias.

In one such well-known indexing procedure, gyroscopic sensor measurements may be made at two distinct rotational positions that are 180 degrees apart from one another. Bias corrected measurement may be determined, for example, by calculating a difference between the two measurements (made at the two rotational positions) and then dividing the difference by two. Moreover, the magnitude of the bias may be determined, for example, by calculating a sum of the two measurements and then dividing the sum by two. It will be appreciated that the disclosed embodiments are, of course, not limited to any particular indexing procedure or even to the use of indexing.

FIG. 3 schematically depicts another gyroscopic surveying tool 100'. In the depicted embodiment, gyroscopic surveying tool 100' includes first, second, and third gyroscopic sensors 162, 164, 166 that collectively make up a triaxially gyroscopic sensor arrangement 160 (e.g., including an x-axis gyroscope, a y-axis gyroscope, and a z-axis gyroscope) deployed in a downhole tool body 105. Gyroscopic surveying tool 100' further includes a triaxial accelerometer arrangement 180 including first, second, and third (e.g., x-axis y-axis, and z-axis) accelerometers 182, 184, 186.

As described above with respect to FIG. 2, the gyroscopic sensors 162, 164, 166 may include substantially any suitable gyroscopes, for example, including a MEMS gyroscope or a fiber optic gyro. The accelerometers 182, 184, 186 may include substantially any suitable accelerometers for use in a downhole surveying too, for example, conventional Q-flex type accelerometers or micro-electro-mechanical systems (MEMS) solid-state accelerometers. The disclosed embodiments are not limited in these regards.

With continued reference to FIG. 3, gyroscopic surveying tool 100' further includes an electronic controller 190. A suitable controller may include, for example, a programmable processor, such as a digital signal processor or other microprocessor or microcontroller and processor-readable or computer-readable program code embodying logic. The controller may be utilized, for example, to receive accelerometer and gyroscope measurements from the accelerometers 182, 184, 186 and gyroscopic sensors 162, 164, 166 (or to cause the accelerometer and gyroscopic sensors to make the measurements). Moreover, a suitable controller may be configured to execute the method embodiments (or various steps in the method embodiments) described in more detail below with respect to FIGS. 4 and 5, for example, to compute compensated gyroscopic measurements as well as gyroscopic toolface and gyroscopic azimuth. A suitable controller may also optionally include other controllable components, such as sensors (e.g., a temperature sensor), data storage devices, power supplies, timers, and the like. The controller may also be disposed to be in electronic communication with the accelerometers and magnetometers. A suitable controller may also optionally communicate with other instruments in the drill string, such as, for example, telemetry systems that communicate with the surface. A suitable controller may further optionally include volatile or non-volatile memory or a data storage device.

Figure 4:
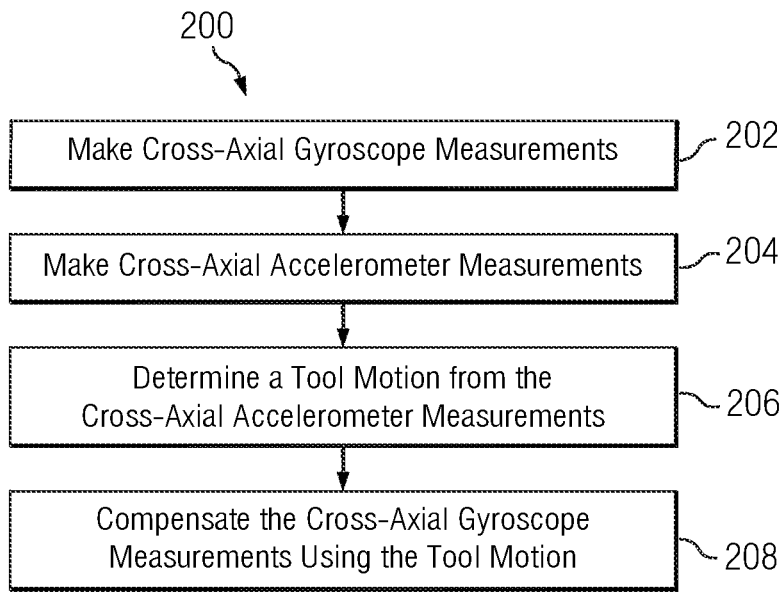
FIG. 4 depicts a flow chart of one example embodiment of a method for compensating downhole cross-axial gyroscope measurements.

Turning now to FIG. 4, a flow chart of one example method 200 for making and compensating downhole cross-axial gyroscope measurements for tool motion is depicted. The tool motion may be induced, for example, via wave action or the motion of the sea in an offshore drilling and/or wellbore surveying operation or via sagging or settling of the drill string in a lateral. As described above, such motion may be cross axial in that it may occur about the cross-axial rotational axes (e.g., the x- and y-axes) in the surveying tool (e.g., from the up and down motion of the sea). By cross-axial it is meant an axis that is orthogonal to the tool and/or wellbore axis (e.g., orthogonal to the z-axis).

Cross-axial gyroscope and cross-axial accelerometer measurements are made at 202 and 204. The measurements may include, for example, static surveying measurements made with a GWD tool or wireline surveying tool. As known to those of ordinary skill, static surveying measurements are commonly made after drilling has temporarily stopped (e.g., when a new length of drill pipe is added to the drill string), and the drill bit is lifted off bottom. Such static measurements are often made at measured depth intervals ranging from about 30 feet to about 90 feet (e.g., about 10 meters to about 30 meters) during a drilling operation.

As noted above, by cross-axial measurements it is meant that the gyroscope and accelerometer measurements include at least one measurement that is substantially orthogonal to the axis of the surveying tool (e.g., at least one of an x-axis or y-axis measurement made using the x-axis and y-axis gyroscopes and accelerometers in FIG. 3). The gyroscope and accelerometer measurements may be made simultaneously, for example, and may include an average measurement that is computed from a large number of discrete measurements. For example, the gyroscope and accelerometer measurements may be made and averaged over a predetermined time period such as 10 seconds, 20 seconds, 30 seconds, or longer. The disclosed embodiments are not limited in this regard.

With continued reference to FIG. 4, the cross-axial accelerometer measurements may be evaluated at 206 to determine (e.g., compute) a tool motion, for example, including a cross-axial rotational tool motion component. The tool motion may then be further evaluated at 208 to compensate the cross-axial gyroscope measurements. For example, the rotational components of the tool about the x- and/or y-axes may be removed (e.g., subtracted) from the original cross-axial gyroscope measurements made at 202.

Figure 5:
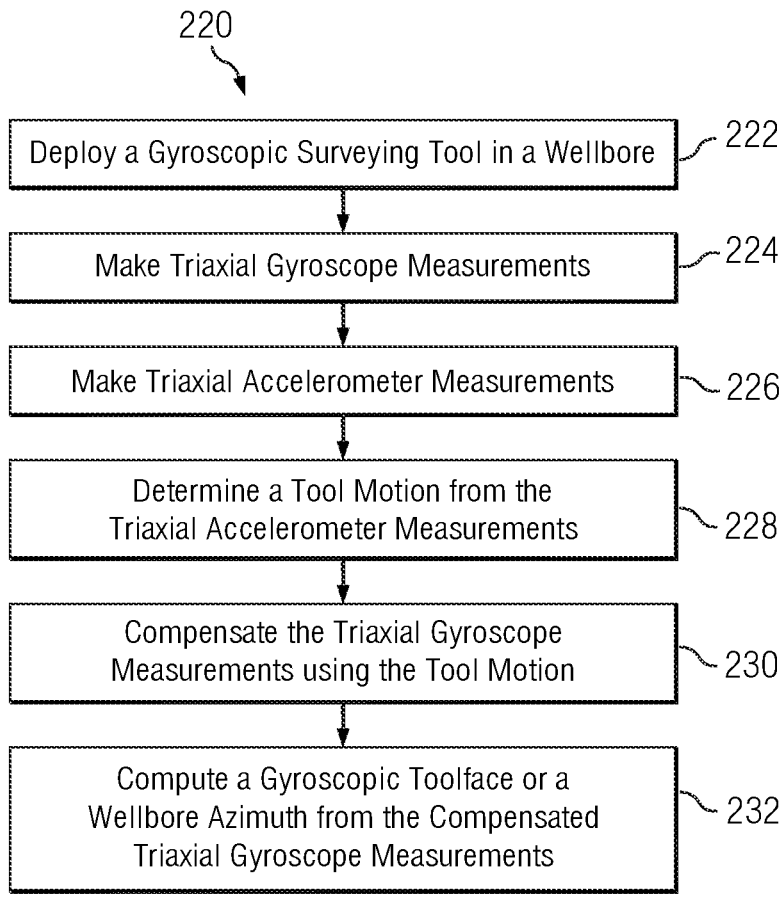
FIG. 5 depicts a flow chart of one example method making gyroscopic toolface and/or gyroscopic azimuth measurements in a wellbore.

FIG. 5 depicts a flow chart of an example method 200 for making gyroscopic toolface and/or gyroscopic azimuth measurements (gyrocompass measurements) in a wellbore. A gyroscopic surveying tool deployed in a subterranean wellbore at 222. The gyroscopic surveying tool may include substantially any suitable gyroscopic measurement tool, for example, including a GWD tool or a WL tool including a plurality of gyroscopic sensors such as depicted in FIGS. 2 and 3. The gyroscopic surveying tool may be used to make cross-axial or triaxial gyroscope measurements in the wellbore (e.g., including x- and y-axis measurements or x-, y-, and z-axis measurements) at 224. Corresponding cross-axial or triaxial accelerometer measurements may be made at 226. As described above, a large number of measurements may be made over a predetermined time interval at a survey station to obtain averaged measurements.

With continued reference to FIG. 5, the accelerometer measurements may be evaluated at 228 to determine (compute) rotational tool motion components in the wellbore (e.g., rotational components of the tool motion about the x- and y-axes or the x-, y-, and z-axes). The gyroscope measurements may be compensated at 230 based upon the determined rotational tool motion components, for example, as described in more detail below. The gyroscopic toolface and/or gyroscopic azimuth may then be computed at 232 from the compensated gyroscope measurements.

As described above, gyroscopic surveying measurements are negatively affected by tool motion in the wellbore. In particular, gyroscopic sensors are not able to distinguish the rotation rate of the Earth from the rotations induced by tool motion (e.g., caused by motion of the sea as described above). As is known to those of ordinary skill in the art, the Earth rotates at a constant rate of about 15.041 degrees per hour. When making gyroscopic surveying measurements, the purpose of the gyrocompass is to measure the horizontal component of the Earth's rotation rate and to compute the tool azimuth therefrom (likewise, a gyroscopic toolface may be computed from the cross-axial gyroscopic measurements of the Earth's rotation). The magnitude of the horizontal component of the Earth's rotation varies with the cosine of the latitude, being the highest at the Equator and zero at the geographical poles. The magnitude of the movement, or external environmental noise, ranges from a fraction of a degree per hour to values exceeding 100 degrees per hour. Depending on this magnitude, the ability to measure the Earth's rotation rate with sufficient accuracy can be significantly impacted. Lengthy procedures and verifications are sometimes necessary to determine the BHA orientation, amounting to sometimes several hours when operating under noisy conditions.

As described above, the disclosed embodiments make use of accelerometer measurements, for example, cross-axial accelerometer measurements or triaxial accelerometer measurements, to determine rotation rate components created by the tool motion. These tool motion induced rotation rates may then be removed (e.g., subtracted) from the original gyroscope measurements to obtain compensated gyroscope measurements. These compensated gyroscope measurements may then be used to compute tool (or wellbore) azimuth and gyroscopic (or inertial) toolface.

The tool azimuth A may be computed, for example, using the compensated triaxial gyroscope measurements via one or more of the following equations:

$$A = \arctan\left[\frac{\omega_{Ex}\cos\alpha - \omega_{Ey}\sin\alpha}{(\omega_{Ex}\sin\alpha + \omega_{Ey}\cos\alpha)\cos I + \omega_{Ez}\sin I}\right] \quad (1)$$

$$A = \frac{1}{\Omega\cos\phi}\arcsin[\omega_{Ex}\cos\alpha - \omega_{Ey}\sin\alpha] \quad (2)$$

$$A = \frac{1}{\Omega\cos\phi}\arccos[(\omega_{Ex}\sin\alpha + \omega_{Ey}\cos\alpha)\cos I + \omega_{Ez}\sin I] \quad (3)$$

where $\omega_{Ex}$, $\omega_{Ey}$, and $\omega_{Ez}$ represent the orthogonal components of the Earth's rotation vector in the tool coordinate system (the x-, y-, and z-axes), I represents the inclination angle, $\alpha$ represents the gravity tool face angle (with respect to the highside of the tool), and $\Omega$ and $\phi$ represent the rotation rate of the Earth and the latitude of the tool on Earth. The inclination angle I and the tool face angle $\alpha$ may be generated from triaxial accelerometer measurements (including the triaxial measurement components ($a_x$, $a_y$, and $a_z$) of the Earth's gravitation vector, for example, as follows:

$$I = \arctan\left[\frac{\sqrt{a_x^2 + a_y^2}}{a_z}\right] \quad (4)$$

$$\alpha = \arctan\left[\frac{-a_x}{-a_y}\right] \quad (5)$$

At low inclination angles (e.g., I<3 degrees), the gyroscopic toolface may be used to monitor the tool orientation in the wellbore. The gyroscopic toolface may be computed, for example, as follows:

$$gyroTF = \arctan\left[\frac{-\omega_x}{-\omega_y}\right] \quad (6)$$

where gyroTF represents the gyroscopic toolface and $\omega_x$ and $\omega_y$ represent the cross-axial gyroscopic measurements. Ideally, for a perfectly stationary tool, $\omega_x$ and $\omega_y$ are equal to $\omega_{Ex}$ and $\omega_{Ey}$. However, as described above, when the tool is not perfectly stationary (as is often the case in offshore drilling operations), the gyroscopes will measure the Earth's rotation rate plus rotational components induced by the motion of the tool, owing for example, to sea movement and wave action in an offshore drilling operation.

One aspect of the disclosed embodiments was the realization that the cross-axial rotational components induced by tool motion may be determined from cross-axial accelerometer measurements. Moreover, it was further realized that a three-dimensional vector of the rotational components induced by tool motion may be determined from triaxial accelerometer measurements.

The measured rotation rate may be expressed mathematically, for example, as follows:

$$\omega_{BI}^B = \omega_{BE}^B + \omega_{EI}^B \quad (7)$$

where $\omega_B^{IB}$ represents the set (e.g., matrix or vector) of gyroscopic measurements (as measured), $\omega_E^{IB}$ represents the set (e.g., matrix or vector) of the Earth's rotation rate in the tool coordinate system (with respect to the inertial space resolved in the tool axes), and $\omega_{BE}^B$ represents the set (e.g., matrix or vector) of rotational components induced by tool motion.

With continued reference to Eq. (7), gyroscopic measurements may be represented in vector form, for example, as follows:

$$\omega_{BI}^B = \begin{bmatrix} \omega_x \\ \omega_y \\ \omega_z \end{bmatrix} \quad (8)$$

where $\omega_x$, $\omega_y$, and $\omega_z$ represent the triaxial gyroscopic measurements (or the triaxial components of the gyroscope measurements in the tool coordinate system). The rotation rate of the Earth in the tool coordinate system may be represented in vector form, for example, as follows:

$$\omega_{EI}^B = \begin{bmatrix} \omega_{Ex} \\ \omega_{Ey} \\ \omega_{Ez} \end{bmatrix} = \quad (9)$$

$$\Omega\begin{bmatrix} \cos\phi\cos A\cos I\sin\alpha + \sin\phi\sin I\sin\alpha + \cos\phi\sin A\cos\alpha \\ \cos\phi\cos A\cos I\cos\alpha + \sin\phi\sin I\cos\alpha - \cos\phi\sin A\sin\alpha \\ \cos\phi\cos A\sin I - \sin\phi\cos I \end{bmatrix}$$

where $\phi$ A, I, $\alpha$, and $\phi$ represent azimuth, inclination, toolface, and latitude as noted above.

The induced rotational components may be represented in vector form, for example, as follows:

$$\omega_{BE}^B = \begin{bmatrix} \omega_{Bx}^B \\ \omega_{By}^B \\ \omega_{Bz}^B \end{bmatrix} \quad (10)$$

where $\omega_{Bx}^B$, $\omega_{By}^B$, and $\omega_{Bz}^B$ represent the rotational components induced by the tool motion. The cross-axial components $\omega_{Bx}^B$ and $\omega_{By}^B$ may be expressed mathematically, for example, as follows:

$$\omega_{Bx}^B = \frac{\dot{a}_y}{\cos I} - \omega_z\tan I\sin\alpha - \Omega_H\cos A\frac{\sin^2 I}{\cos I}\sin\alpha - \Omega_v\sin I\sin\alpha \quad (11)$$

$$\omega_{By}^B = -\frac{\dot{a}_x}{\cos I} - \omega_z\tan I\cos\alpha - \Omega_H\cos A\frac{\sin^2 I}{\cos I}\cos\alpha - \Omega_v\sin I\cos\alpha \quad (12)$$

where $\dot{a}_x$ and $\dot{a}_y$ represent the rate of change with respect to time of the $a_x$ and $a_y$ (cross-axial) accelerometer measurements (i.e., the derivatives of $a_x$ and $a_y$ with respect to time), $\omega_z$ represents the z-axis gyroscope measurements, and $\Omega_H$ and $\Omega_v$ represent the horizontal and vertical components of the Earth's rotation. As is indicated in Eqs. (11) and (12), $\omega_{Bx}^B$, and $\omega_{By}^B$ depend on the z-axis gyroscope measurement $\omega_z$ and the tool azimuth A in the wellbore. It will be appreciated that the gyroscopic azimuth A is an unknown. However, in some operations it may be acceptable to substitute a magnetic azimuth or to use a previously measured azimuth (e.g., when the azimuth is essentially unchanged from station to station).

At low inclinations (e.g., less than about 15 or 20 degrees depending on the level of accuracy required), Eqs. (11) and (12) may be simplified, for example, as follows by ignoring the $\sin^2 I$ terms:

$$\omega_{Bx}^B = \frac{\dot{a}_y}{\cos I} - \omega_z \tan I \sin \alpha - \Omega_v \sin I \sin \alpha \quad (13)$$

$$\omega_{By}^B = -\frac{\dot{a}_x}{\cos I} - \omega_z \tan I \cos \alpha - \Omega_v \sin I \cos \alpha \quad (14)$$

Note that Eqs. (13) and (14) advantageously no longer depends on the tool azimuth A but still depends on the z-axis gyroscope measurement $\omega_z$. At very low inclination (e.g., less than about 5 or 10 degrees, again depending on the required accuracy), Eqs. (11) and (12) may be simplified, for example, as follows by ignoring both the $\sin I$ and $\sin^2 I$ terms:

$$\omega_{Bx}^B = \frac{\dot{a}_y}{\cos I} \approx \dot{a}_y \quad (15)$$

$$\omega_{By}^B = -\frac{\dot{a}_x}{\cos I} \approx -\dot{a}_x \quad (16)$$

At higher inclinations (e.g., non-vertical wellbores in which the inclination is greater than about 15 degrees or in near horizontal wellbores when the inclination is greater than 75 degrees) and when the wellbore azimuth is not changing, the cross-axial components $\omega_{Bx}^B$ and $\omega_{By}^B$ may be approximated mathematically, for example, as follows:

$$\omega_{Bx}^B = -\dot{I} \cos \alpha \quad (17)$$

$$\omega_{By}^B = \dot{I} \sin \alpha \quad (18)$$

where $\dot{I}$ represents the rate of change with respect to time of the inclination.

The z-axis rotational components induced by the tool motion $\omega_{Bz}^B$ may be approximated mathematically, for example, as follows:

$$\omega_{Bz}^B = \dot{\alpha} \quad (19)$$

where $\dot{\alpha}$ represents the rate of change with respect to time of the gravity toolface (e.g., see Eq. (5)).

With reference again to FIGS. 4 and 5, the above-described compensated gyroscope measurements be advantageously used to compute a gyroscopic toolface and/or a gyroscopic azimuth in certain wellbore surveying operations. For example, in near vertical wellbores it is often desirable to make gyroscopic toolface measurements. However, such measurements can be negatively influenced by tool motion, such as sea or wave induced motion countered in offshore drilling operations. This sea or wave induced motion may be advantageously compensated using the rate of change with time of corresponding cross-axial accelerometer measurements and may thereby enable more accurate gyroscopic toolface measurements to be made in such offshore drilling operations.

Figure 6A:
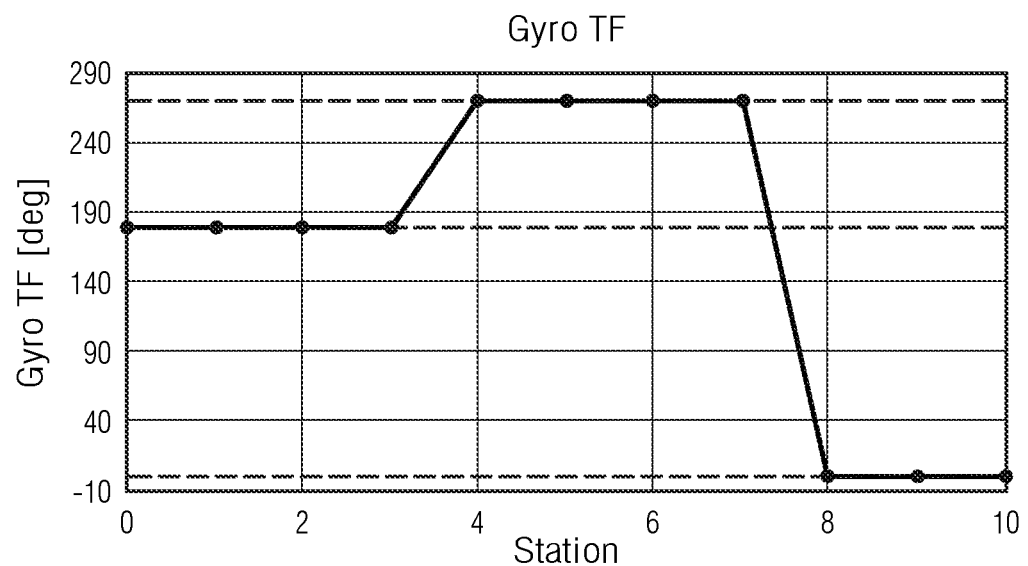
FIGS. 6A and 6B (collectively FIG. 6) depict plots of gyroscopic toolface versus survey station number (6A) and inclination and delta earth rate dER versus survey station number (6B).
Figure 6B:
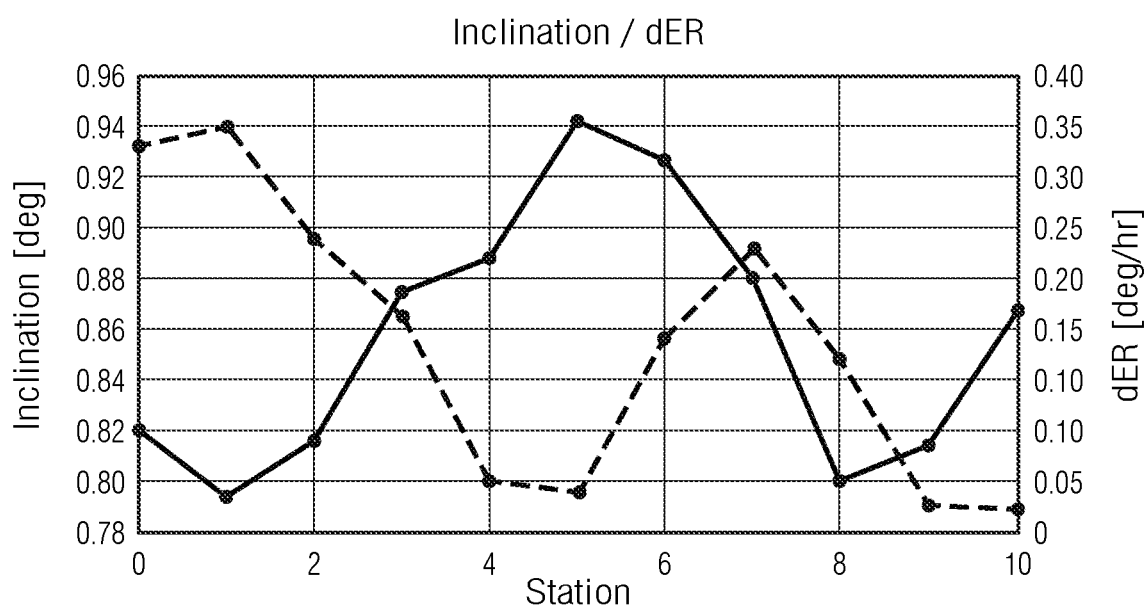

FIGS. 6A and 6B (collectively FIG. 6) depict plots of gyroscopic toolface versus survey station number (6A) and inclination and delta earth rate dER versus survey station number (6B). The operation was performed from a semi-submersible platform and made use of a gyroscopic surveying tool similar to that depicted on FIG. 3 (in that it included a triaxial gyroscopic sensor arrangement). The wellbore was near-vertical, having an inclination of less than one degree as indicated in FIG. 6B. The gyroscopic surveying tool was subject to sea induced motion that resulted in a repetitive heave of the survey tool by about one meter. At the first four survey stations, the survey tool was oriented at a toolface of 180 degrees. It was then rotated to a toolface angle of 270 degrees after which it was rotated to a toolface angle of zero degrees for the final three survey stations.

Prior to compensation of the gyroscopic measurements, the gyroscopic toolface values were largely indistinguishable from one another (owing to the sea induced motion of the tool). The gyroscopic measurements were then compensated using Eqs (15) and (16) and the compensated measurements used to compute the gyroscopic toolface (as described above). As indicated in FIG. 6A, the gyroscopic toolface computed using the compensated gyroscope measurements were very nearly equal to the actual toolface (with an average error of 1.36 degrees).

In other example operations, it may be desirable to make gyroscopic azimuth measurements. For example, in near horizontal wellbores (such as laterals) such measurements can be negatively influenced by either one or both of axial and cross-axial tool motion. The axial motion may be induced, for example, by the release of torsional energy from the drill string while the cross-axial tool motion may be induced, for example, as the drill string sags settles in the lateral section of the wellbore. Such axial induced motion may be advantageously compensated using the rate of change of the gravity toolface determined from accelerometer measurements or the cross-axial induced motion may be advantageously compensated using the rate of change of the inclination determined from the accelerometer measurements. Such compensation may enable more accurate gyroscopic azimuth measurements to be made.

In still other example operations, gyroscopic azimuth measurements may be made while the drill string sags or otherwise moves, such as when rotary steerable system actuators are retrieved or engaged after drilling stops.

It will be understood that the present disclosure includes numerous embodiments. These embodiments include, but are not limited to, the following embodiments.

In a first embodiment, a method for compensating gyroscope measurements includes deploying a gyroscopic surveying tool in a subterranean wellbore; making at least one cross-axial gyroscope measurement in the subterranean wellbore; making accelerometer measurements including cross-axial accelerometer measurements in the subterranean wellbore; evaluating the cross-axial accelerometer measurements to determine at least one tool motion induced cross-axial rotational component; and removing the tool motion induced cross-axial rotational component from the at least one cross-axial gyroscope measurement to determine a compensated cross-axial gyroscope measurement.

A second embodiment may include the first embodiment, wherein the at least one tool motion induced cross-axial rotational component is mathematically related to a rate of change of at least one of the cross-axial accelerometer measurements, an axial gyroscope measurement, and an azimuth of the gyroscopic surveying tool.

A third embodiment may include any one of the first through second embodiments, wherein: the subterranean wellbore has an inclination of less than 10 degrees; and the at least one tool motion induced cross-axial rotational component is proportional to a rate of change of at least one of the cross-axial accelerometer measurements.

A fourth embodiment may include any one of the first through third embodiments, wherein the subterranean wellbore has an inclination of greater than about 15 degrees; and the at least one tool motion induced cross-axial rotational component is proportional to a rate of change of a wellbore inclination derived from the accelerometer measurements.

A fifth embodiment may include any one of the first through fourth embodiments, wherein the making the at least one cross-axial gyroscope measurement comprises making first and second orthogonal cross-axial gyroscope measurements; the making the accelerometer measurements including cross-axial accelerometer measurements comprises making first and second orthogonal cross-axial accelerometer measurements; the evaluating comprises evaluating the first and second orthogonal cross-axial accelerometer measurements to determine first and second orthogonal tool motion induced cross-axial rotational components; and the removing comprises removing the first and second orthogonal tool motion induced cross-axial rotational components from the corresponding orthogonal cross-axial gyroscope measurements to determine first and second orthogonal compensated gyroscope measurements.

A sixth embodiment may include the fifth embodiment, further comprising determining a gyroscopic toolface from the first and second orthogonal compensated gyroscope measurements.

A seventh embodiment may include any one of the first through sixth embodiments, wherein the subterranean wellbore has an inclination of less than 10 degrees; the first of the first and second orthogonal tool motion induced cross-axial rotational components is proportional to a rate of change of the second of the first and second orthogonal cross-axial accelerometer measurements; and the second of the first and second orthogonal tool motion induced cross-axial rotational components is proportional to a rate of change of the first of the first and second orthogonal cross-axial accelerometer measurements.

An eighth embodiment may include any one of the fifth through seventh embodiments, wherein the gyroscopic surveying tool is deployed from an offshore drilling platform; the first and second orthogonal cross-axial gyroscope measurements are made while the gyroscopic surveying tool is subject to sea induced motion.

A ninth embodiment may include any one of the fifth through eighth embodiments, wherein the making at least one cross-axial gyroscope measurement comprises making triaxial gyroscope measurements; the evaluating comprises evaluating the accelerometer measurements to determine tool motion induced triaxial rotational components; and the removing comprises removing the tool motion induced triaxial rotational components from the corresponding triaxial gyroscope measurements to determine triaxial compensated gyroscope measurements.

A tenth embodiment may include the ninth embodiment, further comprising determining a gyroscopic azimuth of the gyroscopic surveying tool from the triaxial compensated gyroscope measurements.

In an eleventh embodiment, a downhole gyroscopic surveying tool includes a downhole tool body; a gyroscopic sensor deployed in the tool body and configured to make cross-axial gyroscope measurements in a wellbore; an accelerometer set deployed in the tool body and configured to make cross-axial accelerometer measurements in the wellbore; and a controller configured to (i) evaluating the cross-axial accelerometer measurements to determine a tool motion induced cross-axial rotational component and (ii) remove the tool motion induced cross-axial rotational component from the cross-axial gyroscope measurements to compute compensated cross-axial gyroscope measurements.

A twelfth embodiment may include the eleventh embodiment, wherein the controller is further configured to determine a gyroscopic toolface from the compensated cross-axial gyroscope measurements.

A thirteenth embodiment may include any one of the eleventh through twelfth embodiments, wherein the gyroscopic sensor is configured to make triaxial gyroscope measurements in the wellbore; the accelerometer set is configured to make triaxial accelerometer measurements in the wellbore; and the controller is further configured to evaluate the triaxial accelerometer measurements to determine tool motion induced triaxial rotational components and remove the tool motion induced triaxial rotational components from the triaxial gyroscope measurements to compute compensated triaxial gyroscope measurements.

A fourteenth embodiment may include the thirteenth embodiment, wherein the controller is further configured to determine a gyroscopic azimuth of the gyroscopic surveying tool from the triaxial compensated gyroscope measurements.

A fifteenth embodiments may include any one of the eleventh through fourteenth embodiments, wherein the controller is configured to determine the tool motion induced cross-axial rotational component as being proportional to a rate of change of at least one of the cross-axial accelerometer measurements when the wellbore has an inclination of less than 10 degrees.

In a sixteenth embodiment, a method for compensating gyroscope measurements includes deploying a gyroscopic surveying tool in a subterranean wellbore; making at least first and second cross-axial gyroscope measurements in the subterranean wellbore; making accelerometer measurements including first and second cross-axial accelerometer measurements in the subterranean wellbore; evaluating the first and second cross-axial accelerometer measurements to determine first and second tool motion induced cross-axial rotational components; removing the first and second tool motion induced cross-axial rotational component from the corresponding first and second cross-axial gyroscope measurements to determine first and second compensated cross-axial gyroscope measurements; and determining at least one of a gyroscopic toolface and a gyroscopic azimuth of the gyroscopic surveying tool using the first and second compensated cross-axial gyroscope measurements.

A seventeenth embodiment may include the sixteenth embodiment, wherein the gyroscopic surveying tool is deployed from an offshore drilling platform; and the first and second orthogonal cross-axial gyroscope measurements are made while the gyroscopic surveying tool is subject to sea induced motion.

An eighteenth embodiment may include the seventeenth embodiment, wherein the subterranean wellbore has an inclination of less than 10 degrees; the first of the first and second orthogonal tool motion induced cross-axial rotational components is proportional to a rate of change of the second of the first and second orthogonal cross-axial accelerometer measurements; and the second of the first and second orthogonal tool motion induced cross-axial rotational components is proportional to a rate of change of the first and second orthogonal cross-axial accelerometer measurements.

A nineteenth embodiment may include the sixteenth embodiment, wherein the gyroscopic surveying tool is settling in the subterranean wellbore while making the at least first and second cross-axial gyroscope measurements in the subterranean wellbore.

A twentieth embodiment may include the nineteenth embodiment, wherein the subterranean wellbore has an inclination of greater than about 15 degrees; and the first and second tool motion induced cross-axial rotational components are proportional to a rate of change of a wellbore inclination derived from the accelerometer measurements.

Although downhole gyroscopic surveying measurements under dynamic conditions and certain advantages thereof have been described in detail, it should be understood that various changes, substitutions and alterations may be made herein without departing from the spirit and scope of the disclosure.

The invention claimed is:

1. A method for surveying a subterranean wellbore, the method comprising:
   deploying a surveying tool in the subterranean wellbore, wherein the surveying tool has a tool axis as well as first and second axes that are orthogonal to the tool axis and orthogonal to one another;
   making cross-axial gyroscope measurements with the surveying tool deployed in the subterranean wellbore, wherein the cross-axial gyroscope measurements are measured with respect to the first axis and the second axis of the surveying tool;
   making accelerometer measurements including cross-axial accelerometer measurements with the surveying tool deployed in the subterranean wellbore, wherein the cross-axial accelerometer measurements are measured with respect to the first and second axes of the surveying tool;
   determining tool motion induced cross-axial rotational components with respect to the first axis and the second axis of the surveying tool by evaluating the cross-axial accelerometer measurements; and
   determining compensated cross-axial gyroscope measurements with respect to the first axis and the second axis of the surveying tool by removing the tool motion induced cross-axial rotational components from the corresponding cross-axial gyroscope measurements; and
   determining at least one of a gyroscopic toolface and a gyroscopic azimuth of the surveying tool based on the compensated cross-axial gyroscope measurements.

2. The method of claim 1, wherein tool motion induced cross-axial rotational components are mathematically related to a rate of change of at least one of the cross-axial accelerometer measurements, an axial gyroscope measurement, and an azimuth of the surveying tool.

3. The method of claim 1, wherein:
   the subterranean wellbore has an inclination of less than 10 degrees; and
   the tool motion induced cross-axial rotational components are proportional to a rate of change of at least one of the cross-axial accelerometer measurements.

4. The method of claim 1, wherein
   the subterranean wellbore has an inclination of greater than 15 degrees; and
   the tool motion induced cross-axial rotational components are proportional to a rate of change of a wellbore inclination derived from the accelerometer measurements.

5. The method of claim 1, wherein:
   the cross-axial gyroscope measurements include first and second cross-axial gyroscope measurements corresponding to the first and second axes of the surveying tool, respectively;
   the cross-axial accelerometer measurements include first and second cross-axial accelerometer measurements corresponding to the first and second axes of the surveying tool, respectively;
   the tool motion induced cross-axial rotational components include first and second tool motion induced cross-axial rotational components corresponding to the first and second axes of the surveying tool, respectively; and
   the compensated cross-axial gyroscope measurements include first and second compensated cross-axial gyroscope measurements corresponding to the first and second axes of the surveying tool, respectively, determined by removing the first and second orthogonal tool motion induced cross-axial rotational components from the corresponding first and second cross-axial gyroscope measurements.

6. The method of claim 5, wherein:
   the first and second cross-axial gyroscope measurements are part of triaxial gyroscope measurements with the surveying tool deployed in the subterranean wellbore;
   the first and second cross-axial accelerometer measurements are part of triaxial accelerometer measurements with the surveying tool deployed in the subterranean wellbore;
   the first and second tool motion induced cross-axial rotational components are part of tool motion induced triaxial rotational components determined by evaluating the triaxial accelerometer measurements; and
   the first and second compensated cross-axial gyroscope measurements are part of compensated triaxial gyroscope measurements determined by removing the tool motion induced triaxial rotational components from the corresponding triaxial gyroscope measurements; and
   at least one of the gyroscopic toolface and the gyroscopic azimuth of the surveying tool is based on the compensated triaxial gyroscope measurements.

7. The method of claim 5, wherein:
   the subterranean wellbore has an inclination of less than 10 degrees;
   the first tool motion induced cross-axial rotational component is proportional to a rate of change of the second cross-axial accelerometer measurements; and
   the second tool motion induced cross-axial rotational component is proportional to a rate of change of the first cross-axial accelerometer measurements.

8. The method of claim 5, wherein:
   the surveying tool is deployed from an offshore drilling structure; and
   the first and second cross-axial gyroscope measurements are made while the surveying tool is subject to sea induced motion.

9. A downhole surveying tool comprising:
   a downhole tool body configured for deployment in a wellbore, wherein the tool body has a tool axis as well as first and second axes that are orthogonal to the tool axis and orthogonal to one another;

a gyroscopic sensor deployed in the tool body and configured to make cross-axial gyroscope measurements in the wellbore, wherein the cross-axial gyroscope measurements are measured with respect to the first and second axes of the tool body;

an accelerometer set deployed in the tool body and configured to make cross-axial accelerometer measurements in the wellbore, wherein the cross-axial accelerometer measurements are measured with respect to the first and second axes of the tool body;

a controller configured to (i) determine tool motion induced cross-axial rotational components with respect to the first axis and second axis of the tool body by evaluating the cross-axial accelerometer measurements, (ii) determine compensated cross-axial gyroscope measurements with respect to the first and second axes of the tool body by removing the tool motion induced cross-axial rotational components from the corresponding cross-axial gyroscope measurements, and (iii) determine at least one of a gyroscopic toolface and a gyroscopic azimuth of the surveying tool based on the compensated cross-axial gyroscope measurements.

10. The tool of claim 9, wherein:
the gyroscopic sensor is configured to make triaxial gyroscope measurements in the wellbore;
the accelerometer set is configured to make triaxial accelerometer measurements in the wellbore; and
the controller is further configured to i) determine tool motion induced triaxial rotational components by evaluating the triaxial accelerometer measurements, (ii) determine compensated triaxial gyroscope measurements by removing the tool motion induced triaxial rotational components from the triaxial gyroscope measurements, and (iii) determine at least one of a gyroscopic toolface and a gyroscopic azimuth of the surveying tool based on the compensated triaxial gyroscope measurements.

11. The tool of claim 9, wherein the controller is configured to determine the tool motion induced cross-axial rotational components as being proportional to a rate of change of at least one of the cross-axial accelerometer measurements when the wellbore has an inclination of less than 10 degrees.

12. A method for surveying a subterranean wellbore, the method comprising:
deploying a surveying tool in the subterranean wellbore, wherein the surveying tool has a tool axis as well as first and second axes that are orthogonal to the tool axis and orthogonal to one another;
making first and second cross-axial gyroscope measurements with the surveying tool deployed in the subterranean wellbore, wherein the first and second cross-axial gyroscope measurements correspond to the first and second axes of the surveying tool, respectively;
making accelerometer measurements including first and second cross-axial accelerometer measurements with the surveying tool deployed in the subterranean wellbore, wherein the first and second cross-axial accelerometer measurements correspond to the first and second axes of the surveying tool, respectively;
determining first and second tool motion induced cross-axial rotational components corresponding to the first and second axes of the surveying tool, respectively, by evaluating the first and second cross-axial accelerometer measurements;
determining first and second compensated cross-axial gyroscope measurements corresponding to the first and second axes of the surveying tool, respectively, by removing the first and second tool motion induced cross-axial rotational components from the corresponding first and second cross-axial gyroscope measurements; and
determining at least one of a gyroscopic toolface and a gyroscopic azimuth of the surveying tool based on the first and second compensated cross-axial gyroscope measurements.

13. The method of claim 12, wherein:
the surveying tool is deployed from an offshore drilling structure; and
the first and second orthogonal cross-axial gyroscope measurements are made while the surveying tool is subject to sea induced motion.

14. The method of claim 12, wherein:
the subterranean wellbore has an inclination of less than 10 degrees;
the first tool motion induced cross-axial rotational component is proportional to a rate of change of the second cross-axial accelerometer measurement; and
the second tool motion induced cross-axial rotational component is proportional to a rate of change of the first cross-axial accelerometer measurement.

15. The method of claim 12, wherein the surveying tool is settling in the subterranean wellbore while making the at least first and second cross-axial gyroscope measurements in the subterranean wellbore.

16. The method of claim 12, wherein:
the subterranean wellbore has an inclination of greater than 15 degrees; and
the first and second tool motion induced cross-axial rotational components are proportional to a rate of change of a wellbore inclination derived from the accelerometer measurements.

\* \* \* \* \*